UNITED STATES PATENT OFFICE.

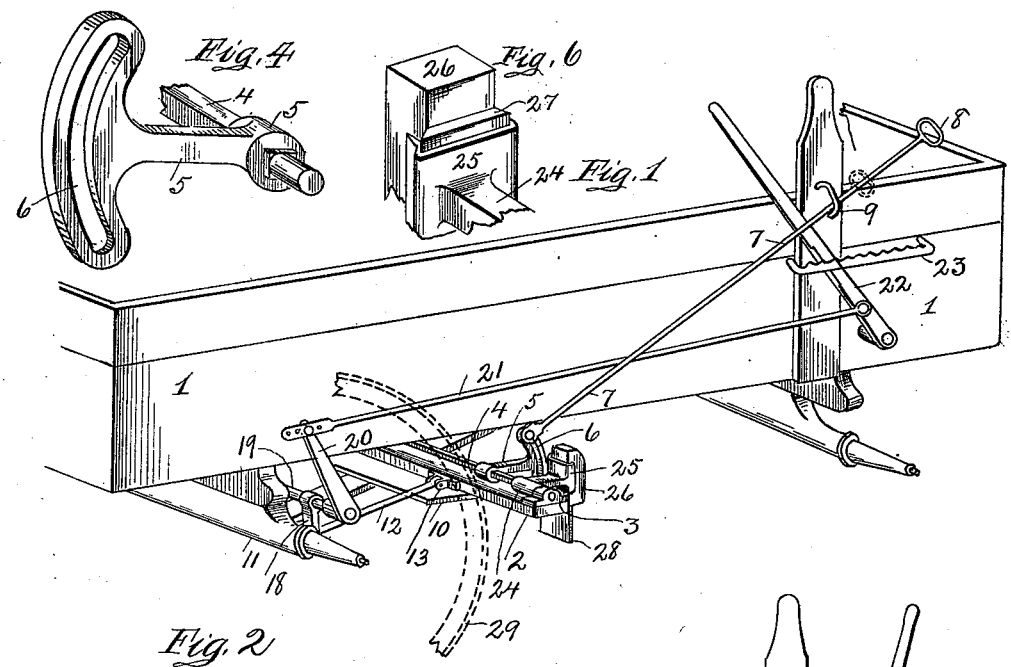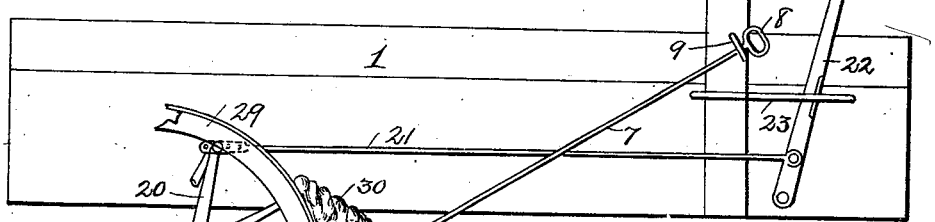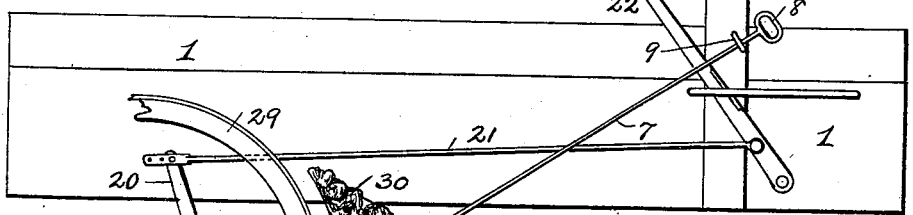

HAMILTON M. CLEMENTS, OF PLUM, PENNSYLVANIA.

REVERSIBLE RUBBER-BLOCK HOLDER.

SPECIFICATION forming part of Letters Patent No. 665,510, dated January 8, 1901.

Application filed June 9, 1900. Serial No. 19,787. (No model.)

*To all whom it may concern:*

Be it known that I, HAMILTON M. CLEMENTS, a citizen of the United States of America, residing in Plum township, in the county of Allegheny and State of Pennsylvania, have invented certain new and useful Improvements in Reversible Rubber-Block Holders or Shoes; and I do hereby declare the following to be a full, clear, and exact description thereof, reference being had to the accompanying drawings, which form a part of this specification.

This invention relates to an improved reversible rubber-block holder or shoe for vehicles, and is intended to get rid of the mud collected by the rubber block or brake-shoe when the brake is set, the said mud being a hindrance to an easy movement of the wagon. Ordinarily but a small space is provided between the rubber block and the tire of the wheel when the brake is thrown off, and this space soon fills when passing over muddy roads. In accordance with this invention the rubber block is mounted in such a manner as to be thrown back or reversed, resulting in dislodging and throwing off accumulated mud and providing a comparatively large space between it or the brake-beam and the tire of the wheel. For a full description of the merits thereof, and also to acquire a knowledge of the details of construction of the means of effecting the result, reference is to be had to the following description and the drawings hereto attached.

While the essential and characteristic features of the invention are necessarily susceptible of modification, still the preferred embodiment of the invention is illustrated in the accompanying drawings, in which—

Figure 1 is a perspective view of the device, showing the same in connection with a wagon, and in which the rubber block is reversed or thrown back to remove the accumulated mud. Fig. 2 is a side elevation of the invention, showing the brake set to lock the wheels, illustrating the manner in which the mud gathers upon the rubber block and brake-beam while passing over muddy roads. Fig. 3 is a similar view showing the brake thrown off or away from the wheel. Fig. 4 is an enlarged detailed perspective view of the slotted segment to which the operating-rod is connected for reversing the rubber blocks. Fig. 5 is an enlarged detailed view of the joint or connection between the brake-beam and connecting part. Fig. 6 is a perspective view of a portion of the rubber-block holder, showing the means for attaching a supplemental block for the purpose of securing an apron over the bearing and upon which the mud gathers.

Corresponding and like parts are referred to in the following description and indicated in all the views of the drawings by the same reference numerals or characters.

To construct an apparatus in accordance with my invention, and thereby provide a means for throwing off the mud accumulated upon the top of the brake block and beam and at the same time revolve the said brake-block to a position entirely free from interference from the wheel, I mount in bearings 3, attached to the brake-beam 2, a strong shaft 4. This shaft 4 extends the entire length of the brake-beam 2 and is free to rotate in its bearings and provided on the brake side of the wagon 1 with a slotted segment, the said segment consisting of an arm 5, securely keyed to the shaft and formed with an integral segmental slotted portion 6. Loosely connected to the slotted portion 6 by means of a pin or roller is an operating-rod 7, which extends upward and forward to a point within reach of the driver and has its extremity formed with a handhold 8. This operating-rod 7 is passed through a staple 9, secured in the body of the wagon, and by a back or forward movement of the said rod the shaft 4 may be rotated in its bearings. Securely fixed to the shaft 4 at points opposite or in front of the rear wheels 29 of the wagon are the brake-block holders, each of which consists of an arm 24, having formed thereon a double box 25, (see Fig. 6,) capable of holding the rubber block 26 and a supplemental block 27 immediately at the rear and used for the purpose of attaching by means of nails or tacks a thin leather apron 28, upon which the mud from the wheels accumulates.

The apparatus and parts of the brake mechanism shown in the drawings are such as are in common use on road-wagons. Therefore it is not deemed necessary to describe the same in detail.

To provide a means for taking up the wear between the rock-shaft 19 of the brake and its connection 12 with the brake-beam 2, I form from metal a bracket 13, (see Fig. 5,) consisting of slotted lugs 13, between which the front end of connecting-rod 12 is received and made fast by means of a tapering pin 14, passing through transversely-alining openings formed in the parts or lugs 13. The smaller end of the tapering pin 14 receives a coil-spring 16, which is confined between a stop or nut 15 at the outer end of the pin 14 and the adjacent lug of the bracket, and this spring 16 is of the expansible type and normally exerts a force tending to move the pin 14 through the parts of the bracket in the direction toward its smaller end, whereby wear is automatically taken up and a loose joint prevented.

When the hand-lever 22, used to operate the brakes, is released from its notched bracket 23 and the rod 7 drawn forward to the position shown at Fig. 1 of the drawings, the brake-shoe 26 is revolved to the extent of a complete semicircle, thereby throwing off all the mud accumulated upon the top of the shoe. At Fig. 2 of the drawings the brake is set and the mud 30 gathered upon the top of the block and apron 28. Fig. 3 shows the brake released and moved back from the wheel, the mud still upon the brake-block and apron, and if it is desired to remove the said mud 30 it is only necessary to draw upon the handle 8, moving the rod 7 forward, which movement will revolve the brake-block to a position such as shown at Fig. 1 of the drawings, thereby throwing off the mud.

The means for reversing the brake-block are entirely independent of the mechanism for releasing or setting the brakes, and the one will not interfere with the other.

Having thus described my invention, what I claim, and desire to secure by Letters Patent, is—

1. In a vehicle-brake, the combination with the brake-beam, operating toward and away from the wheel, rubber blocks movably mounted upon the brake-beam, and independent means for actuating the rubber blocks to throw them either forward or rearward, substantially as described.

2. In a brake for vehicles, a brake-beam, means for shifting the same toward or away from the wheels, a rock-shaft journaled to the brake-beam, rubber blocks projecting from the rock-shaft and attached thereto so as to move therewith and means for turning the rock-shaft in its bearings to throw the rubber blocks forward or rearward, substantially as specified.

3. In a vehicle-brake, a brake-beam, means under the control of the driver for throwing the brake-beam forward and backward, a rock-shaft journaled in bearings applied to the brake-beam, arms secured to the rock-shaft and provided at their outer ends with rubber blocks, and independent means under the control of the driver for turning the rock-shaft in its bearings to throw the rubber block either forward or rearward, substantially as described.

4. In a vehicle-brake, a rock-shaft mounted in bearings upon the brake-beam, rubber blocks secured to the said shaft and projecting laterally therefrom, an operating-rod and loose connection between the operating-rod and the rock-shaft, substantially as set forth.

5. In combination with a rock-shaft having offstanding arms, a connection secured to the said shaft and having a part provided with a segmental slot, and an operating-rod having loose connection with the said segmental slot so as to move medially in the latter from one end to the other when operating the shaft, as and for the purpose set forth.

In testimony whereof I have hereunto affixed my signature in the presence of two subscribing witnesses.

HAMILTON M. CLEMENTS.

Witnesses:
GEO. B. ALTER,
M. ZIMMERMAN.